United States Patent

Nafarrate

[11] 3,962,538
[45] June 8, 1976

[54] FLYING SPOT SCANNING SYSTEM WITH VIRTUAL SCANNERS

[75] Inventor: Antonio B. Nafarrate, Milpitas, Calif.

[73] Assignee: Xerox Corporation, Stamford, Conn.

[22] Filed: Nov. 21, 1974

[21] Appl. No.: 525,695

[52] U.S. Cl. .................................. 178/7.6
[51] Int. Cl.² ............................... H04N 1/04
[58] Field of Search ........... 178/7.6; 352/106, 109, 352/110, 134; 353/30, 34, 37; 355/51, 60; 250/204

[56] References Cited
UNITED STATES PATENTS

| | | |
|---|---|---|
| 1,261,800 | 4/1918 | Evans .................................. 353/54 |
| 2,028,485 | 1/1936 | Wright ................................. 353/54 |
| 2,977,844 | 4/1961 | Winker ................................. 353/34 |
| 3,597,536 | 8/1971 | Fowler ................................. 178/7.6 |
| 3,856,990 | 12/1974 | Favreau ................................ 178/7.6 |
| 3,867,751 | 2/1975 | Starkweather ........................ 178/7.6 |

Primary Examiner—Howard W. Britton
Assistant Examiner—Michael A. Masinick
Attorney, Agent, or Firm—John E. Beck; Terry J. Anderson; Irving Keschner

[57] ABSTRACT

A flying spot scanning system is provided which uses directed light from a scanning element, which directed light is reflected through a symmetrical arrangement of prisms for scanning across a medium with a planar object surface. Virtual scanners provide a segmented focal plane whereby the effective scan angle of the system is reduced.

14 Claims, 4 Drawing Figures

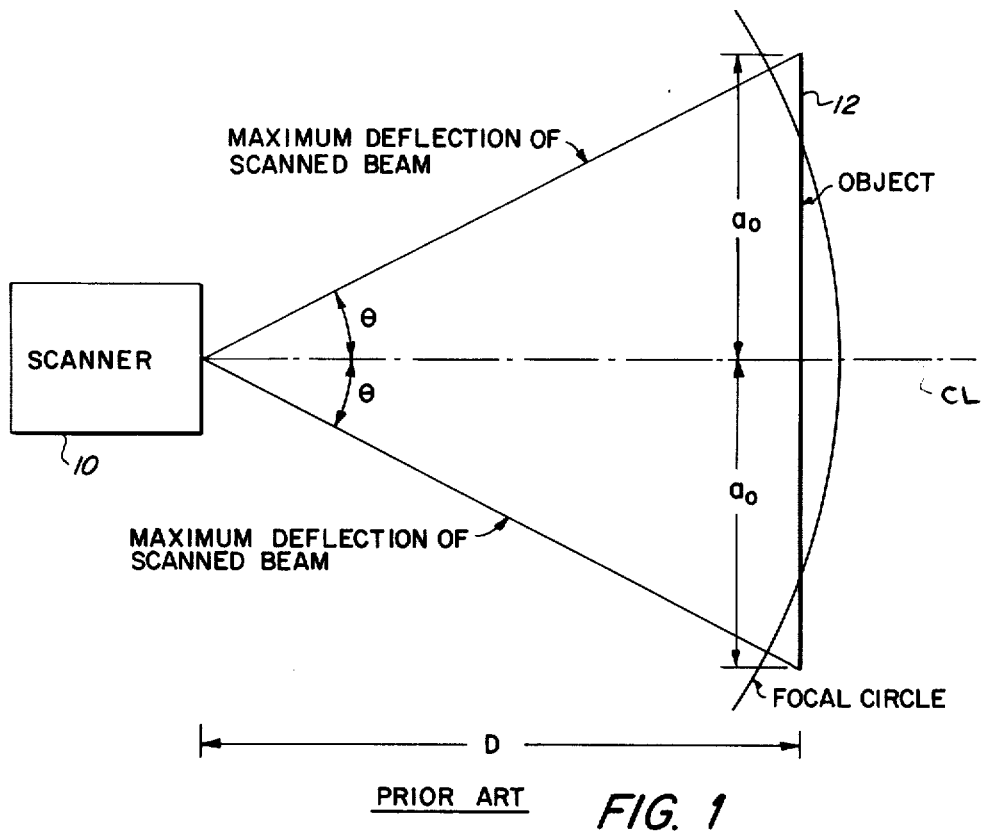
PRIOR ART   FIG. 1
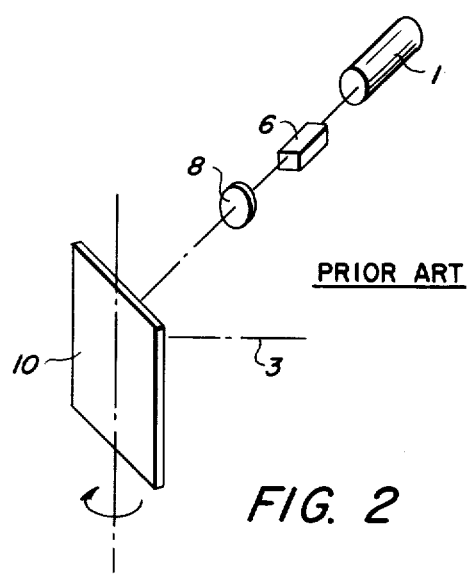
PRIOR ART
FIG. 2

3,962,538

FLYING SPOT SCANNING SYSTEM WITH VIRTUAL SCANNERS

BACKGROUND OF THE INVENTION

This invention relates to a flying spot scanning system for communicating video information to or reading information from a scanned medium, and more particularly to a scanning system which utilizes a symmetrical arrangement of reflective surfaces between the scanning element and the scanned medium for field flattening.

Much attention has been given to various optical approaches in flying spot scanning for the purpose of imparting the information content of a modulated light beam to a scanned medium. Galvanometer arrangements have been used to scan the light across a document for recording its information content thereon. Such arrangements have included planar reflecting mirrors which are driven in an oscillatory fashion. Other approaches have made use of multifaceted mirrors which are driven continuously. Various efforts have been made to define the spot size in order to provide for an optimum utilization of the scanning system.

One such effort is that described in U.S. Pat. No. 3,675,016. The approach used was to make the spot size invariant and as small as possible by defining the dimensions of the focused beam so that only part, preferably half, of a mirror facet is illuminated during scanning. This teaching alludes to generalized techniques for assuring the constancy of the size of the aperture of a rotating mirror scanning system.

Other approaches, such as that taught in U.S. Pat. application Ser. No. 488,332, filed on July 15, 1974, and assigned to the assignee of the present invention, have sought to assure a uniform spot size at the scanned medium. A convolution of focusing elements may be selected, for example, to provide an adequate depth of focus at the planar surface of the medium to compensate for focal plane errors due to the arcuate path of the scanned spot.

The present invention offers still another approach to the avoidance of focal plane error.

It is thus an object of the present invention to provide a flying spot scanning system which avoids focal plane error.

It is yet another object of the present invention to provide a spot scanning system which provides an effective uniform spot size at the contract loci of the spot with the scanned medium.

It is a further object of the present invention to provide a spot scanning system which utilizes symmetrical reflective surfaces for reducing the effective scan angle of the directed light beam.

Other objects of the invention will be evident from the description hereinafter presented.

SUMMARY OF THE INVENTION

The invention provides a flying spot scanning system which employs a scanning element for directing a beam of light to focus to a spot upon the planar surface of a medium and for enabling the spot to traverse the medium throughout a scan width. A light source, such as a laser, generates the beam of light controlled by the scanning element. The directed light beam is reflected through a symmetrical arrangement of prisms which provide virtual scanners for scanning the spot across the planar object surface.

Another feature of the invention is the modulation of the original light beam by means of a video signal. The information content within the video signal is thereby imparted to the light beam itself. The medium to be scanned is one which is responsive to the modulated beam and records its information content as contained within the scanning spot in a usable form on its surface across the scan width.

Still another feature of the invention is that the arrangement of prisms is configured to reduce the effective scan angle of the directed light beam whereby focal plane errors are substantially reduced.

Yet another feature of the invention is that said virtual scanners may be mixed with the scanning element itself for the correction of focal plane error.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE DRAWINGS

FIG. 1 is a schematic drawing of conventional prior art scanning geometry;

FIG. 2 is an isometric illustration of a prior art scanning element in conjunction with a source of imaged, modulated light;

DESCRIPTION OF THE PREFERRED EMBODIMENT

Figure 3:
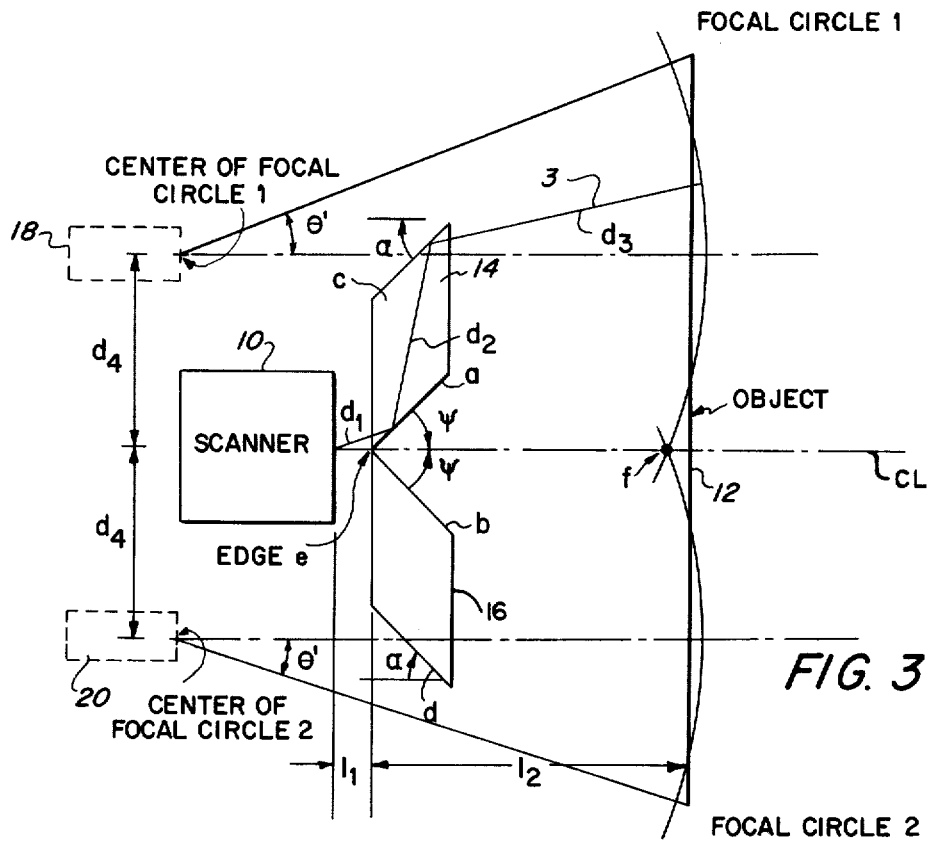
FIG. 3 is a schematic drawing of a scanning system in accordance with the invention.

In FIG. 1, conventional prior art scanning geometry is shown throughout. A scanning element 10 directs a light beam 3 throughout a scan angle 2θ. The beam 3 is imaged to a spot in an arcuate focal circle which is designed in relation to a medium with a planar object surface 12. The focused spot is scanned by the scanner 10 throughout a scan width of 2a. across the surface 12. Focal plane errors are associated with such a scanning geometry in that the planar surface 12 does not match the focal circle through which the spot maintains a uniform size. The scanner 10 is shown located at a distance D from the surface 12.

The scanner 10 may be any conventional scanning element, such as an acousto-optical deflector, a scanning polygon, or even a galvanometer. As shown in FIG. 2, a galvanometer 10 is shown as the scanning element. A light source 1 provides the original light beam for utilization by the scanning system. The light source 1 is preferably a laser which generates a collimated beam of monochromatic light which may easily be modulated by a modulator 6 in conformance with the information contained in a video signal.

The modulator 6 may be any suitable electro-optical modulator for recording the video information in the form of a modulated light beam at its output. The modulator 6 may be, for example, a Pockel's cell comprising a potassium dihydrogen phosphate crystal, whose index of refraction is periodically varied by the application of the varying voltage which represents the video signal. The video signal may contain information either by means of binary pulse code modulation or wide-band frequency code modulation. In any event, by means of the modulator 6, the information within the video signal is represented by the modulated light beam.

The light beam is imaged by a lens 8 to a spot in a focal circle defined with respect to the planar surface 12. While various prior art teachings have used field-flattened lenses to correct for focal plane error, such approaches have required the use of multi-element lenses and/or large amounts of glass for the lens elements.

In FIG. 3 is shown a flying spot scanning system in accordance with the invention. The light beam 3 is directed by the scanner 10 against a symmetrical arrangement of prisms 14 and 16 whose reflective surfaces $a$, $b$, $c$ and $d$ redirect the beam 3 for scanning the imaged spot across the surface 12 throughout two focal circles 1 and 2. The prisms 14 and 16 are joined at a vertex $e$ oriented symmetrically about the center line CL which bisects the scan angle $2\theta$. The beam 3 when directed against the surface $a$ of the prism 14 becomes segmented into portions $d_1$, $d_2$, and $d_3$. The path $d_1$ defines the beam 3 in relation to the surface $a$, the path $d_2$ represents the path of the beam 3 as reflected from the surface $a$, which in turn is reflected from the surface $c$ along the path $d_3$ to image to a spot in the focal circle 1.

The focal circle 1 has a radius of $d_1 + d_2 + d_3$, whose center is located a distance $d_4$ from the original center-line CL. $d_4$ is chosen to be equal to $a_o/4$ where $2a_o$ has been defined as the scan width or total object width. $d_4$, then, may be considered to be the "offset" of the effective scans respective to the focal circles 1 and 2. A virtual scanner 18 is thereby provided for the scanning of the spot throughout the focal circle 1.

As the scanned beam 3, which is of finite size, begins to intercept the vertex edge $e$, part of the beam strikes both the surface of the mirror $a$ and the surface of the mirror $b$. The portion of the beam 3 striking the mirror $b$ is in turn reflected to the mirror $d$. Of course, the beam 3 is again segmented into the 3 paths of travel $d_1$, $d_2$, and $d_3$ to focus to the focal circle 2. A virtual scanner 20 is thereby provided for the scanning of the spot throughout the focal circle 2.

To provide optimal overlap at the line $f$ where $e$ is imaged by both the surfaces $c$ and $d$, the surfaces $d$ and $c$ are aligned with respect to each other by adjustment of the prisms 14 and 16, such that the vertex $e$ is imaged by the surfaces $c$ and $d$ into the same line. Since any part of the beam 3 striking the surface $b$ does not strike the surface $a$, the total beam energy at the surface 12 is almost constant as the beam 3 scans across the vertex $e$. Because the beam 3 is to be focused at the surface 12, its transverse extent is relatively large at the junction of the mirrors $a$ and $b$, and therefore the total relative energy scattered from the vertex $e$ is small. In this way energy is prevented from being scattered from the vertex $e$ and reflected by way of the surfaces $c$ and $d$ to undesired parts of the object surface 12.

The surfaces $a$ and $b$, in this preferred embodiment, are oriented with respect to the center line CL at an angle $\psi$ of 45°, respectively. The surfaces $c$ and $d$ of the prisms 14 and 16 are aligned respective to the center line CL at an angle $\alpha$, which is just under 45°, adjusted such that the vertex $e$ is simultaneously imaged to the line $f$ by both the surfaces $c$ and $d$.

The angle $\alpha$ is, in the preferred embodiment, related to the angle $\psi$ by the following approximation:

$$\tan(2\Psi - 2\alpha) = \frac{a_o/2}{l_2 + (a_o/2)\tan(2\Psi - \pi/2)}$$

where $l_2$ is the distance of the vertex $e$ from the surface 12. $l_1$ is the distance between the scanner 10 and the vertex $e$.

EXAMPLE 1:

$\psi = 45°, a_o = 6'', d_1 = 4'', d_2 = 26'' \tan(90° - 2\alpha) = 3/[26 + 3.\tan(0°)] \alpha = 41.7°$

EXAMPLE 2:

$\psi = 60°, a_o = 6'', d_1 = h'', d_2 = 26'' \tan(120° - 2\alpha) = 3/[26 + 3.\tan(30°)] \alpha = 56.9°$ To achieve the same angle $\theta$ defined in the prior art scanning configuration shown in FIG. 1, the paths $d_1 + d_2 + d_3$ is set equal to D/2. The surfaces $c$ and $d$ may also be shaped to correct the focal curves so that it more nearly corresponds to the planar object surface 12. Additionally, the present invention provides a substantially flattened scan that nearly corresponds to planar object surface 12 by reducing the required scan angle. In particular, referring to FIG. 3, the scan angle $\theta'$, or effective scan angle of the virtual scanners 18 and 20, is reduced from the scan angle $\theta$, shown in FIG. 1, by a factor of two (the figures are not drawn to scale). The effective scan angle of the system is reduced by a factor equal to the square of the number of prisms utilized. For the system shown in FIG. 3, the effective scan angle of the system, therefore, is reduced by a factor of four.

Figure 4:
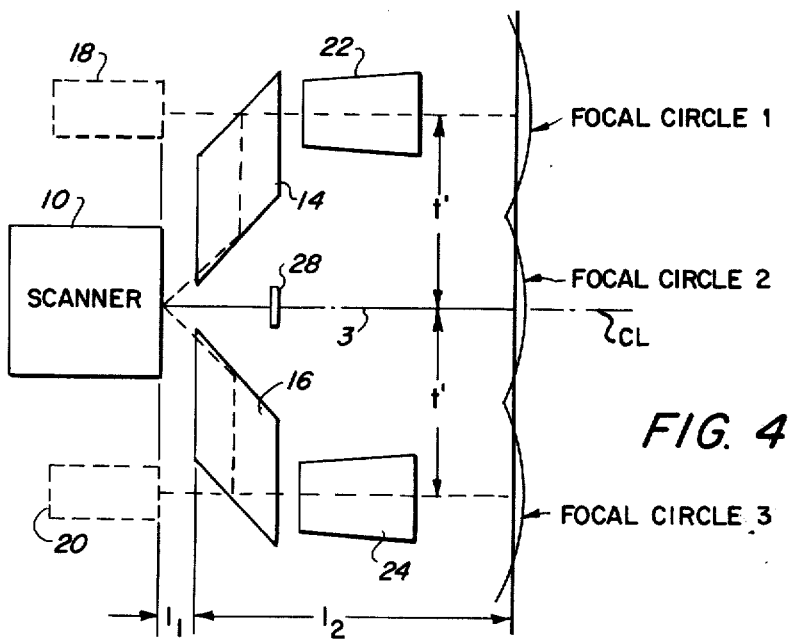
FIG. 4 is a schematic drawing of another scanning configuration which embodies features of the invention.

In FIG. 4 is shown another scanning system in accordance with the invention. The virtual scanners 18 and 20 are located a distance $t'$ from the center-line CL, the scanners 18 and 20 being implemented in the same manner as described above. The scanner 20, however, in this embodiment, scans the spot throughout a focal circle 3. The focal circle 2 is defined in relation to the scanner 10 itself in that the prisms 14 and 16 are spaced from each other.

Two glass parallel plates 22 and 24 are respectively disposed in the scanning paths of the beam 3 relative to the virtual scanners 18 and 20. The plates 22 and 24 provide a coincidence of the focal object planes of the scanner 10 and the virtual scanners 18 and 20. The total path $t$ of the beam 3 traveled in the glass of one of the prism/plate configurations is preferably equal to $t'(1 - 1/n)^{-1}$ where $n$ is the index of refraction to provide such a coincidence. The prisms 14 and 16 and plates 22 and 24 are designed to conform to this relationship.

If both the prisms 14 and 16 and the plates 22 and 24 are of glass, with $n = 1.5$, $t$ is approximately equal to the total scan width $2a_o$, provided that the center beams of the scanners 10, 18, and 20 are parallel and the scan width is split into three equal fields by the focal circles 1, 2, and 3.

To match the intensity of the beam 3 which is directed by the scanner 10 in relation to the focal circle 2 with the beams directed by the virtual scanners 18 and 20, a filter 28 is disposed in the beam path as shown in FIG. 4. A suitable filter 28 would be a neutral density filter which would absorb light sufficiently to provide the desired intensity. If the beam 3 is polarized light, then the filter 28 could be a polarizer.

The optical scanning systems disclosed in this preferred embodiment has related to a "write" mode wherein a photosensitive medium may provide the object surface 12 for the recording of the information content of the scanning spot. In a "read" mode, an original picture or document called the object would provide the object surface 12 to be scanned by an unmodulated beam 3 to determine the reflected or transmitted intensity (and possibly color) vs. position.

Obviously, many modifications of the present invention are possible in light of the above teaching. It is therefore to be understood that, in the scope of the appended claims, the invention may be practiced other than as specifically described.

What is claimed is:

1. An optical scanning system for scanning a surface comprising:
   means for providing a beam of high intensity light,
   means for imaging said beam to a spot in a focal plane,
   scanning means for directing said beam throughout a predetermined scan angle, and
   optical means between said scanning means and said surface for redirecting said beam, said optical means being comprised of at least two prisms oriented symmetrically about the center-line which bisects said predetermined scan angle, the reflective surfaces of said prisms providing at least two contiguous focal circles that define a focal plane, said redirected bean scanning said contiguous focal circles as said beam is directed through said predetermined scan angle, the centers of each focal circle being located remote from said scanning means, the scan angle of said beam as it scans each focal circle being less than said predetermined scan angle.

2. The system as defined in claim 1 wherein two prisms contact at the center-line to form a vertex with corresponding reflective surfaces symmetrical about the center-line to direct said beam toward opposing, respective reflective prism surfaces which are oriented symmetric to the center-line.

3. The system as defined in claim 2 wherein said contacting surfaces are joined at the vertex on the center-line at an angle $\psi$ to the center-line and said opposing surfaces are at an angle $\alpha$ to the center-line.

4. The system as defined in claim 3 wherein the angles $\psi$ and $\alpha$ are related by $$\tan(2\Psi - 2\alpha) = \frac{a_o/2}{l_2 + (a_o/2)\tan(2\Psi - \pi/2)}$$

where $a_o$ is equal to one-half the scan width and $l_2$ is the distance of the vertex from the surface.

5. The system as defined in claim 1 wherein said prisms are maintained at a distance from one another such that virtual scanners are defined respective to two separate focal circles and said scanning means alone defines an additional focal circle contiguous with said two focal circles, said additional focal circle defining an additional focal plane contiguous with the focal plane formed by said separate focal circles.

6. The system as defined in claim 5 wherein is further included glass plates, each of which corresponds to one of said prisms in the path of said beam between said respective prisms and the focal plane such that the focal planes respective to said virtual scanners are matched with the focal plane respective to said scanning means.

7. The system as defined in claim 6 wherein is further included filter means disposed between said scanning means and said surface for matching the intensity of the beam directed by said scanning means with the beams directed by said virtual scanners.

8. Apparatus for recording information from an electrical signal onto a scanned medium comprising:
   means for providing a beam of high intensity light,
   means for modulating the light beam in accordance with the information content of an electrical signal,
   means for imaging said beam to a spot in a focal plane proximate to the linear surface of a light sensitive medium,
   scanning means for directing said beam throughout a predetermined scan angle, and
   optical means between said scanning means and said medium for redirecting said beam, said optical means being comprised of at least two prisms oriented symmetrically about the center-line which bisects said predetermined scan angle, the reflective surfaces of said prisms providing at least two contiguous focal circles that define a focal plane, said redirected beam scanning said contiguous focal circles as said beam is directed through said predetermined scan angle, the centers of each focal circle being located remote from said scanning means, the scan angle of said beam as it scans each focal circle being less than said predetermined scan angle.

9. The system as defined in claim 8 wherein two prisms contact at the center-line to form a vertex with corresponding reflective surfaces symmetrical about the center-line to direct said beam toward opposing, respective reflective prism surfaces which are oriented symmetric to the center-line.

10. The system as defined in claim 9 wherein said contacting surfaces are joined at the vertex on the center-line at an angle $\psi$ to the center-line and said opposing surfaces are at an angle $\alpha$ to the center-line.

11. The system as defined in claim 10 wherein the angles $\psi$ and $\alpha$ are related by $$\tan(2\Psi - 2\alpha) = \frac{a_o/2}{l_2 + (a_o/2)\tan(2\Psi - \pi/2)}$$

where $a_o$ is equal to one-half the scan width and $l_2$ is the distance of the vertex from the medium.

12. The system as defined in claim 8 wherein said prisms are maintained at a distance from one another such that virtual scanners are defined respective to two separate focal circles and said scanning means above defines an additional focal circle contiguous with said two focal circles, said additional focal circle defining an additional focal plane contiguous with the focal plane formed by said separate focal circles.

13. The system as defined in claim 12 wherein is further included glass plates, each of which corresponds to one of said prisms in the path of said beam between said respective prisms and the focal plane such that the focal planes respective to said virtual scanners are matched with the focal plane respective to said scanning means.

14. The system as defined in claim 13 wherein is further included filter means disposed between said scanning means and said medium for matching the intensity of the beam directed by said scanning means with the beams directed by said virtual scanners.

* * * * *